Feb. 13, 1923.
J. F. KOHLER
PARING MACHINE
Original Filed Aug. 4, 1920
1,445,147
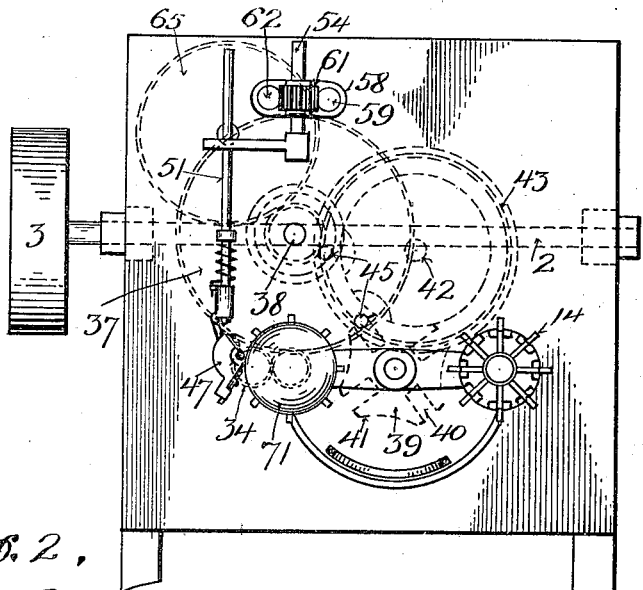
FIG. 1.
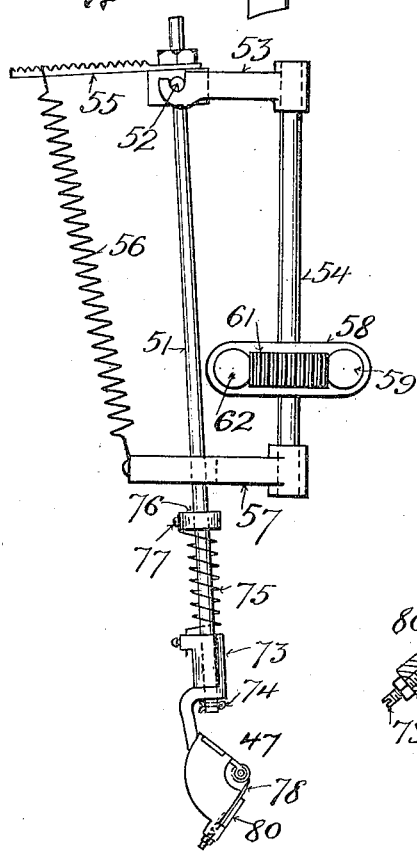
FIG. 2.
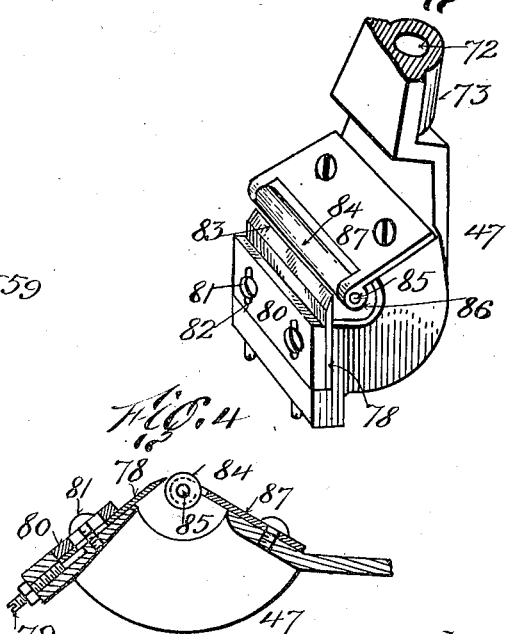
FIG. 3.
FIG. 4.
John F. Kohler, Inventor
By his Attorney
Charles G. Hensley Patented Feb. 13, 1923.

1,445,147

UNITED STATES PATENT OFFICE.

JOHN F. KOHLER, OF LARCHMONT MANOR, NEW YORK.

PARING MACHINE.

Application filed August 4, 1920, Serial No. 401,179. Renewed August 8, 1922. Serial No. 580,569.

*To all whom it may concern:*

Be it known that I, JOHN F. KOHLER, a citizen of the United States, and a resident of Larchmont Manor, county of Westchester, and State of New York, have invented certain new and useful Improvements in Paring Machines, of which the following is a specification.

My invention relates to machines for paring edible products and it is especially adapted for paring the brown skin from cocoanuts, although it is not limited to this particular use. When the large kernel or cocoanut has been removed from the shell the cocoanut has a thin brown skin covering the meat and in order to prepare the cocoanut for use this skin is first removed or pared off. It is desirable to remove all portions of this skin but with as little waste of meat as possible, and in my co-pending applications Ser. No. 313751 filed July 28, 1919 and Ser. No. 333,428 filed October 25, 1919, I have shown machines adapted to pare cocoanuts economically, quickly and uniformly. The present invention may be used in conjunction with either of the machines shown in said applications; and in order to simplify the showing in the present case I have shown my invention applied to the latter of said machines.

The object of my present invention is to provide for a swiveling or pivotal motion of the paring knife which will permit the knife to conform to or adjust itself to the irregularities of the cocoanut during the paring operation in order that no portions of the cocoanut shall escape the paring operation of the knife. This pivotal action is in addition to the pivotal action of the knife carrying arms of my said co-pending cases which permits the knife to move toward and from the cocoanut. In the preferred form of my invention the knife carrying arm swings on its pivot and the knife swings or turns on the carrying arm according to irregularities in the surface of the cocoanut. While the knife is adapted to be turned about its axis by the cocoanut there is a spring to prevent the knife turning entirely away from the cocoanut and it also returns the knife to an initial position after disengaging from one cocoanut, in readiness to engage in proper relation with the succeeding cocoanut as it is presented for paring.

Another object of my invention is to provide means for preventing the accumulation of the parings at the cutting edge of the knife. The paring knife is provided with a guard to control the depth of cut, and heretofore the parings had a tendency to cling or accumulate at the cutting edge of the knife or between this edge and the guard and these parings often interfered with the proper paring action of the knife. In the present case the guard is provided with movable means which prevents the parings from clogging the knife.

In the drawing forming part of this application,

Figure 1 is an elevation of a machine like that shown in my said co-pending application Ser. No. 333,428 but with my present improvements applied thereto.

Figure 2 is a side elevation of the paring knife and associated parts.

Figure 3 is a perspective view of the knife holder and knife, and

Figure 4 is a sectional view of the knife and its holder.

In my said co-pending applications I have shown complete paring machines and the present device may be employed therein simply by substituting the parts shown herein for corresponding parts in said machines. In said applications I have shown means for holding and revolving the cocoanuts and for moving them to and away from the paring position and such parts require no modification for the application of my present invention. The parts in Figure 1 corresponding with the parts in Figure 1 of my application Ser. No. 333,428 are designated by the same reference numerals.

Power is applied to the pulley 3 to operate the main shaft 2, and from the latter the shafts 42 and 38 are operated through the gears 43, 46. The shaft 5 is operated intermittently by a Geneva movement 39, and by pins 45 on the gear 43, the same as in my said application, and the shaft 5 carries arms 7 on which the revolvable nut holders are mounted. At 71 I have shown a cocoanut presented to the paring knife for paring and it is understood that the nut is here revolved, preferably by the same means as that shown in my said application. The shaft 62 may be reciprocated in the manner shown in said case and it carries a block 59 which has a rack for operating the pinion 61. The latter is mounted on the shaft 54 and the oscillation of this shaft causes the paring knife to swing on an arc corresponding with a portion of the circumference of the cocoanut and the lateral movement of the shaft 54 causes the knife to move the distance from the equatorial line of the cocoanut to its apex. All of these parts correspond with those shown in my said pending application.

On the shaft 54 there is an arm 53 which is provided with a fork forming a bearing socket for a pin 52 on which the knife arm 51 rocks. The latter passes through a slot in and is guided by an arm 57 also fixed to the shaft 54. There is an arm 55 fixed to the knife arm 51 and it is pulled down by a spring 56 for the purpose of swinging the arm 51 and therefore pressing the knife against the cocoanut.

The knife holder 47 in the present case is loose on the arm 51 so that it may revolve with this arm as its axis. For this purpose the arm 51 passes through an aperture 72 in the hub 73 of the knife holder and the cotter pin 74 retains the holder on the arm. There is a coiled spring 75 surrounding the arm 51 and it has one end fixed to the holder 47 and the other end fixed to a collar 76 which is adapted to be held in adjusted positions on the arm 51 by a screw 77.

The knife blade 78 is set in a recess in the holder and it is adapted to be adjusted in position relatively to the guard by means of adjusting screws 79 which press against the back edge of the knife to urge it forwardly. The knife is clamped in the holder by a plate 80 which is secured by screws 81 which pass through the slots 82 in the plate and knife. Adjacent the cutting edge 83 of the knife I have provided a movable guard to control the depth of cut made by the knife and in the form of my invention shown herein this guard consists of a roller 84 extending parallel with the cutting edge of the knife and mounted to revolve freely on an arbor 85 mounted in the bearings 86 of the plate 87 which is attached to the holder.

Operation: The cocoanuts or other articles to be pared are moved into position for paring on the carrier as shown in Figure 1 and then the cocoanut is revolved. When the cocoanut is in position the knife is pressed toward it by the action of the spring 56 which rocks the arm 51 on its pivot 52. The edge 83 of the knife penetrates the skin of the cocoanut and the roller guard 84 rests against the cocoanut and determines the depth of cut of the knife. As the cocoanut revolves, the knife is moved from the middle line of the cocoanut to the apex so that one half thereof is pared. Before the cocoanut is presented to the knife the holder 47 is held in position to receive it by the spring 75 which normally places the knife in the initial position. As the cocoanut revolves there is a tendency for parts to escape the paring action of the knife due to the surface irregularities of the cocoanut, but in this construction the knife holder is turned about the arm 51 as a pivot, by the cocoanut itself, and therefore the point of contact or cutting of the knife follows the irregularities of the cocoanut automatically. I have found that this action makes it possible to remove a very thin paring and yet not escape any portion of the surface of the cocoanut. In this operation the nut turns the knife holder against the action of the spring 75 the latter tending always to hold the knife in a given position.

When the cocoanut moves away from the knife the holder 47 is swung back into normal position by the spring 75 if it is not in that position.

The paring cut off by the knife passes under the edge 83 thereof and between the knife and guard. As the parings are more or less moist they have a tendency to clog between the knife and guard. In this device, however, the roller 84 is revolved by the cocoanut and the moving roller advances the paring so that it does not accumulate against the knife edge and interfere with the paring operation.

Having described my invention, what I claim is:

1. In a paring machine including means for holding and revolving a cocoanut or other article to be pared, the combination of a paring knife and a guard adapted to contact with the cocoanut, means for moving the knife toward the cocoanut during the paring operation, and a pivot on which said knife is adapted to be oscillated by the cocoanut whereby the knife may follow irregularities in the surface thereof.

2. In a paring machine including means for holding and revolving a cocoanut or other article to be pared, the combination of a paring knife and a guard adapted to contact with the cocoanut, means for pressing the knife toward the cocoanut during the paring operation, and a pivot on which said knife is adapted to be oscillated by the cocoanut on an axis disposed at right angles to the cutting edge of the knife whereby the knife may follow irregularities in the surface of the cocoanut.

3. In a paring machine including means for holding and revolving a cocoanut or other article to be pared, the combination of a paring knife and guard adapted to contact with the cocoanut, means for pressing the knife toward the cocoanut during the paring operation, a pivot on which said knife is adapted to be oscillated by the cocoanut whereby the knife may follow irregularities in the surface thereof, and resistible means for automatically returning said knife on its pivot to an initial position.

4. In a paring machine including means for holding and revolving a cocoanut or other article to be pared, the combination of an arm and a paring knife and guard thereon, means for swinging the arm to press the knife and guard against the cocoanut, during the paring operation, said holder being mounted to turn on said arm whereby the knife may follow irregularities in the surface of the cocoanut, a coiled spring surrounding said arm and having one end engaging said holder and an adjustable collar on said arm to which the other end of the said spring is connected, said spring being adapted to resist the turning of said holder by the cocoanut and adapted to return the knife to an initial position.

Signed at the city, county and State of New York, this 21st day of July, 1920.

JOHN F. KOHLER.